Patented July 10, 1945

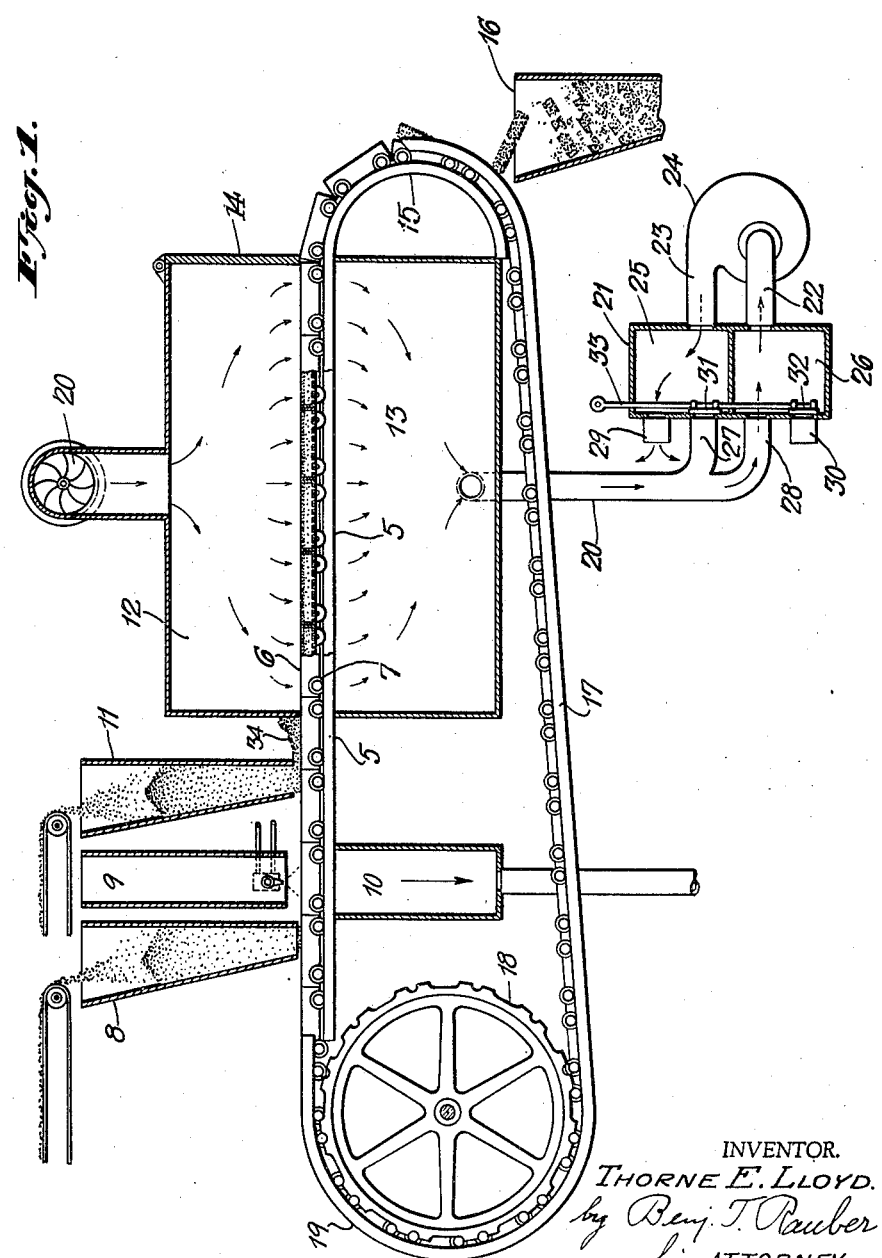

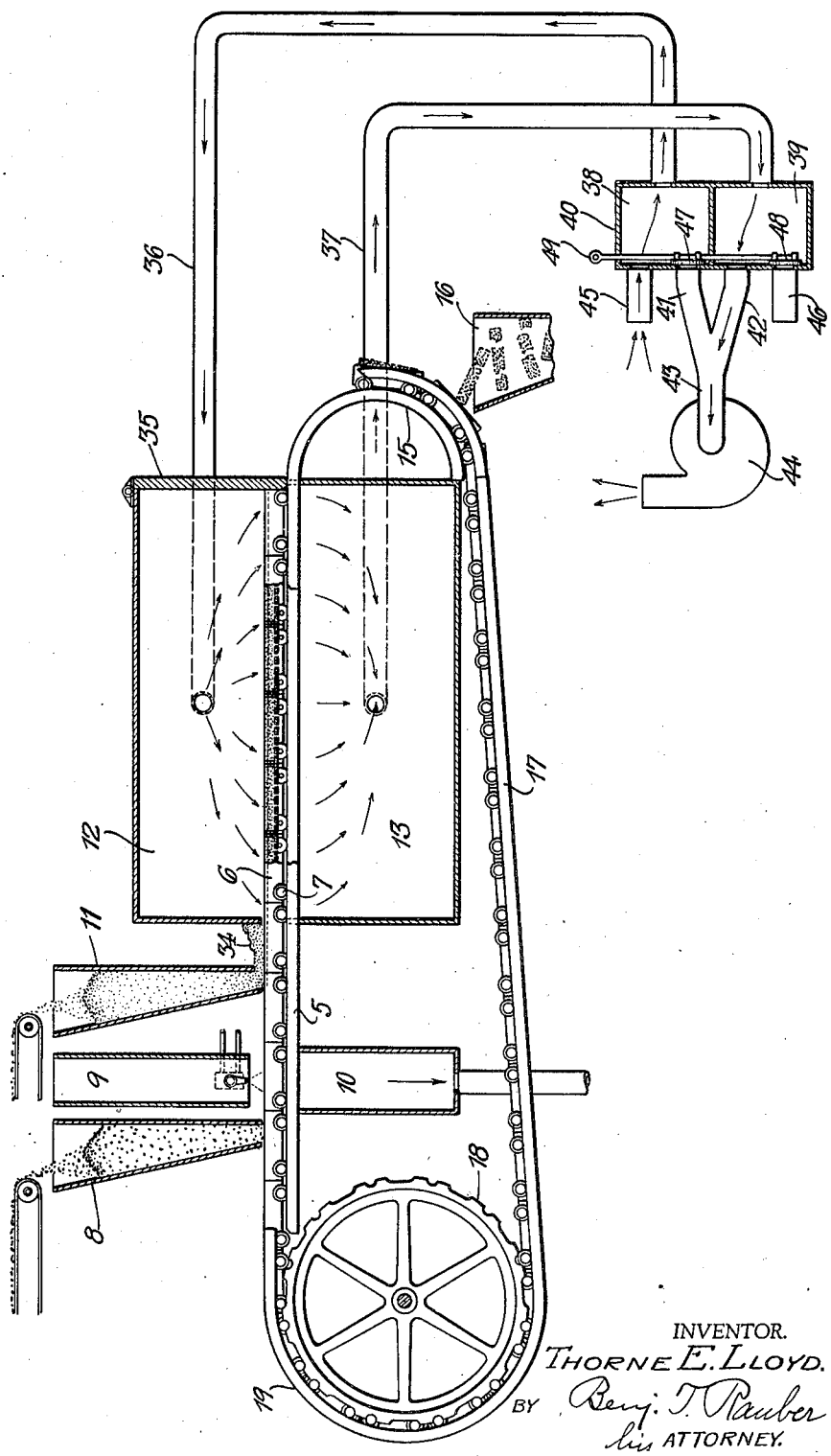

2,380,056

UNITED STATES PATENT OFFICE 2,380,056

HEAT-TREATING PROCESS AND APPARATUS

Thorne E. Lloyd, Bear Pond, N. J., assignor to Dwight & Lloyd Sintering Company, Inc., New York, N. Y., a corporation of Delaware Application July 18, 1942, Serial No. 451,419

21 Claims. (Cl. 75—5)

My invention relates to a process and apparatus for heat treatment of various materials in any suitable apparatus, such as that used for sintering as, for example, the Dwight & Lloyd type, and more particularly to a process and apparatus in which a greater control over the heat treating conditions is provided than heretofore available.

Heretofore in sintering material such as ores or concentrates on a sintering machine, such as continuous sintering machines of the Dwight & Lloyd type, the ores or concentrates, either containing enough combustible material or with added fuel, were charged onto grates or pallets of the sintering machine, the charge then ignited from above and air was drawn downwardly through the sinter bed. As a result the combustion and other reactions concerned therewith began at the upper surface in a thin horizontal plane and this plane gradually traveled downward to the lower surface.

Air drawn downwardly through the sinter bed was first preheated as it approached the combustion zone by the sintered calcined or roasted material immediately above the combustion zone, and upon reaching this zone the highly preheated oxygen combining with the combustible material created an intense combustion at a high temperature. As the hot combustion gases passed downwardly they in turn served to preheat the charge immediately underlying the combustion zone so that both the air and the material to be oxidized were brought to a high temperature at the combustion zone immediately prior to combustion. The combustion reactions took place in a very short time in a very narrow zone and at a very high temperature. The time of combustion in many cases was insufficient for the complete oxidation of certain combustibles, such as sulphur in the ore, or for other desired reactions. Also there was a liability of the sulphide molecules within the sinter to become "locked" by the effects of fusion and to receive an insufficient amount of air for complete combustion.

Lack of control of temperature and time impeded or prevented the attainment of desired low sulphur content in certain ores or concentrates.

In treating other materials, such as the calcining of limestone or sintering of dolomite, either for the production of lime for building or other purposes, or for refractory materials for metallurgical purposes, the lack of control of temperature and time conditions was an obstacle in the use of sintering processes and machines for this purpose.

In my invention I control the time and the temperature of the reactions in the bed to be treated and also may control the thickness of the combustion layer or reaction zone in the bed as it passes upwardly or downwardly therethrough. This I accomplish conveniently by alternating the direction of the draft or blast through the bed so that it passes in one period, for example, downwardly through the treated material, then into the combustion or reaction zone, and thence downwardly through the material to be treated as in the usual sintering process. And in the second, or alternate period, a gas is passed in the reverse direction upwardly first through the material, not yet treated, then through the combustion zone, and thence through the material that has already been heat treated. In this way the heat of combustion is, in successive periods or intervals, carried back into the layers through which the combustion zone has just passed and further through colder material which collects or absorbs heat and into the atmosphere, with the result that the temperature in the combustion zone is moderated or lowered by this abstraction of heat therefrom, whereas the temperature in the zones that have just been treated is maintained.

Accordingly, by controlling the frequency and the lengths of the alternate periods and the strength of the draft or blast, the temperature that may be reached in the combustion or reaction zone may be reduced as much as desired to suit the conditions of any particular situation, and the layer immediately above may be maintained at a high temperature sufficient to ignite residual amounts of combustible elements, such as sulphur, in the presence of the hot reverse air blast, or to oxidize the mineral values to oxide, or to promote other heat reactions. By limiting or controlling the temperature in the combustion or reaction zone, an excessive fusion may be avoided.

In calcining such materials as limestone, the alternate blasts may be controlled to provide ample time and heat for the decomposition of the carbonates and for driving off the carbon dioxide, while avoiding such a temperature as would cause any undesired fusion. Thus, once the sinter bed has been ignited and ignition has passed below the upper surface thereof, with each reversal of the draft a certain amount of heat is drawn upwardly and expended on reheating the upper particles. As the draft is again brought downward in a down-draft period a portion near the top of the sinter cake cools somewhat and the layer immediately below the ignition zone is gently ignited. The draft being again reversed and passing upwardly, the recently ignited charge expends its heat on the cooling sinter above, thus bringing it back to a heat at which the desired reaction, such as oxidation may take place.

The alternation of controlled intervals is thus controlled until the charge is sintered or calcined to a desired degree.

It will be understood that the periods of time may be equal or unequal and may be varied both as to intensity and draft, and as to time, as heat treatment proceeds.

The double-drafting as above may be employed either to conserve or dissipate heat from the combustion within the charge.

As an example of the use of the process for treating ores or concentrates, the treatment of a zinc sulphide concentrate of about 30% sulphur may be taken. A mixture of 50% concentrate and 50% of returns of minus 6 mesh contained 17.2% sulphur. Such a mixture contains an excess of fuel or sulphur for a simple down-draft sintering in the manner heretofore employed. When sintered by the usual methods heretofore used it often came off hot and contained a large quantity of residual sulphur and its porosity had usually been impaired either because of excessive zinc oxide crystals or too great a fusion, or both. A 4 inch deep bed, for example, on a ½ inch hearth layer required a sintering time of at least 20 minutes. This same mixture in a 5 inch deep bed placed on a ½ inch hearth and treated with the same alternating change of draft described above for a period of 35 minutes, gave a sinter containing less than 0.02% of sulphur.

This extremely low percentage of sulphur may be less than is required for some purposes, but illustrates the generally desirable sulphur content, less than ¼ of 1 per cent, that can be obtained.

In this particular instance the alternate up and down drafts were each made under a pressure difference of 4½ inches of water, down-drafts lasting 10 seconds, and the up-drafts 20 seconds. This alternation of drafts was continued for a period of 10 minutes, when the pressure was increased to 6¾ inches of water with intervals for the up and down drafts for an additional 25 minutes, making the total time 35 minutes. The resulting sinter cake came off the machine very hot and well sintered. It contained a negligible amount of minus 4 mesh loose or loosely adhering fines from the sides and top, which ran 1.52% sulphur.

The process is readily applicable to other metal media, ores and concentrates, such as pyrites, the sulphides of nickel, copper, lead, etc., carbonates, oxides, sulphates, etc., The process is also applicable to the sintering or calcining of other materials, for example, for the sintering of dolomite for refractory purposes. Heretofore the sintering of dolomite has been done in two steps—first with fluxing agents, such as iron scale or iron ore and about 10% coke or coal to drive off the carbon dioxide, and second, with about 7% additional coke or coal to sinter with the dolomite and render it stable against air slacking. With a single one-way draft the evolution of carbon dioxide in large quantities carried off so much heat that little of the required fluxing would take place.

In my process, however, calcining of the dolomite may be accomplished with sufficient sintering of a large part of the charge in one sintering operation. For example dolomite was mixed with 15% of fine anthracite coal and 4% of iron scale. The charge of coal, iron scale and dolomite rock was damped and mixed and spread on the sinter machine in a bed 10 inches deep. A bed 5 inches thick was first laid and ignited at its upper surface and covered with 5 inches of charge so that the bed was ignited interiorly between its upper and bottom surfaces. A ½ inch layer of sintered dolomite was placed on top of the bed to retain heat at the surface of the bed and thus to obtain complete sintering to the top surface of the raw dolomite charge. It was then subjected to sintering with comparatively large air volumes, alternating the draft at varying periods.

For example, in another sintering run the bed was subjected to down and up drafts of 60 seconds duration each and under vacuum of, in each case, 5 inches of water for a period of 15 minutes. The draft was then reduced to a vacuum of 4½ inches of water and subjected for 5 minutes to alternate down-drafts of 30 seconds duration and up-drafts of 60 seconds; after this the draft was reduced to 3 inches of water vacuum and alternate blasts continued for the same periods or an additional 5 minutes. The draft could then be reduced to a vacuum of 2 inches of water and blasting continued with 30 seconds down-draft and 60 seconds up-draft for a further period of 10 minutes making the total time 35 minutes.

Limestone may also be calcined easily by my process. Heretofore in attempting to calcine limestone on a sintering machine with a continuous down-draft, it has been necessary to limit the fuel to about 5% in order to prevent excessively high localized temperatures and a resulting fusion of some of the limestone with ash in the fuel, or impurities in the limestone itself. However, because of the large amount of carbon dioxide evolved and the correspondingly large amount of heat carried away in it, this was not enough fuel to complete the calcining of the larger particles, making it necessary to draw hot gases through the charge from other combustible material as, for example, by the combustion of fuel oil, blast furnace gas, natural or coal gas. This not only increased the cost of fuel, but the necessity of applying this heat under a brick hood extending the length of the machine caused deterioration, not only of the brick, but of the iron pallets of the sintering machine.

However, when alternate drafts are applied to the sintering bed, the heat obtained by the combustion of the fuel may be diffused as required throughout the bed of material being calcined so that excessively high temperatures in fusing may be avoided independently of the amount of fuel used. The heat generated by the combustion of the fuel is, therefore, used most advantageously to supply the heat required for the decomposition of the limestone into lime and carbon dioxide.

As an example of such calcination, a bed of limestone was laid on a sintering grate and insulated from the bottom and sides of the grate by a ½ inch thick layer of previously calcined lime of a mesh minus ⅜ inch and plus ¼ inch. The bed was laid in alternating layers, one minus ¾ inch to plus ⅜ inch limestone and another layer being of minus ⅜ inch to plus ⅙ inch of limestone; these layers being laid on alternately beginning with the larger size stone. The charge contained minus 8 mesh soft coal, equal to 13% by weight of the limestone, all of which was mixed with the larger size stone which was moistened. The minus ⅜ inch to plus ⅛ inch stone was applied dry. The plus ⅜ inch stone contained 68% of the limestone charge, and the minus ⅜ inch limestone contained 32% of the limestone. The bed thus formed was covered with a ½ inch thick layer of previously burned or calcined limestone of about ⅜ inch mesh. The depth of the bed including the hearth layer and top dressing was 10 inches. After each layer of stone and coal mixture was laid the top of this layer was lightly rolled to smooth it flat before applying the smaller size dry stone layer.

Ignition was with a gas flame and took 4 minutes with a 4 inch vacuum. The vacuum used in both up and down drafts was 4 inches of water. The down-draft periods were of 120 seconds; the up-draft periods were of 180 seconds and the time of sintering was 60 minutes. The product was well calcined throughout and without partially burned or calcined product at the top, sides or bottom.

The process can be carried on in any suitable apparatus for the alternating reverse drafts through the sintering bed.

A sintering machine embodying the various features of the invention is illustrated, by way of example, in Fig. 1 which shows diagrammatically a vertical section of the machine with an arrangement for reversing draft, and Fig. 2 is a diagrammatic view of an alternative embodiment of machine and draft reversing apparatus.

In the apparatus shown in Fig. 1, the sintering machine comprises a pair of spaced tracks 5, on and between which are supported a succession of pallets 6, the wheels 7 of which rest on the tracks 5. These pallets are pushed successively below a main hopper 8 from which a layer of charge to be sintered is placed on the pallets to build up a sintering bed of the required depth, then the pallets pass below an ignition muffle 9 which applies a flame or other source of heat to bring the upper surface of the bed to the ignition temperature. A draft to draw this flame or heating agent down onto and into the sinter bed may be provided by an auxiliary windbox or suction box 10 placed immediately below the ignition muffle 9. Any device capable of bringing the upper surface part of the sinter bed to or above ignition temperature may be used.

From the ignition muffle 9 the pallets pass below an auxiliary hopper 11 from which may be supplied or released if desired enough more of the charge on the ignited surface to form a small cover or riffle as the pallets pass beneath a hood 12 and thus seal the front edge of the hood against free passage of air. Immediately below the hood 12 is a windbox 13 sealed to the pallets from which air may be exhausted and to which air may be supplied in alternating sequence.

As the pallets successively reach the opposite end of the hood 12 they pass below and in as close contact as possible with the lower edge of the end wall 14 and thence out of the hood 12. In passing downwardly about the curved ends of the tracks 5, at 15, the sintered material is discharged from the pallets into a receiving hopper 16. The pallets are then returned by return tracks 17 to a driving wheel 18 which pushes them around an opposite curved end 19 of the track 17 into position on the tracks 5 to pass successively below the hopper 8, ignition chamber 9 and hopper 11 into the hood 12.

While the hood 12 is sealed as closely as possible to the pallets 6, it is also maintained under a balanced pressure with the outside atmosphere by means of an equalizing fan 20 through which air is supplied to and gases exhausted from the hood 12 to maintain pressure approximately equal to that of the atmosphere and thus minimize any tendency of air or gas to pass into or from the hood except through the bed of material on the pallets.

The blasts of air, or products of combustion, are supplied to or withdrawn from the pallets 6 by means of the windbox 13. This air is exhausted from or supplied to the windbox 13 through a pipe 20 and a reversing valve 21 which connects the pipe 20 alternately with an intake 22 and delivery pipe 23 of a fan or blower 24.

For this purpose the reversing valve 21 comprises a delivery compartment 25 and an exhaust compartment 26 connected to the pipe 20 by branches 27 and 28 and also connected to the delivery pipe 23 and intake 22 of the fan or blower 24.

The delivery compartment 25 of the reversing valve 21 is also provided with an outlet port 29 which may exhaust into the atmosphere or into a stack or conduit. Similarly the intake compartment 26 is provided with an intake port 30 through which air may be drawn into the compartment and thence into the intake pipe 22 of the fan 24.

The branch pipe 27 and the outlet or delivery port 29 may be closed alternatively by means of a sliding valve 31, and similarly the branch 28 and inlet port 30 may be closed alternatively by a sliding valve 32, the valves 31 and 32 being mounted on a common valve stem or rod 33.

The valves are so arranged on the rod 33 that in the lowermost position the branch 27 and the intake port 30 are both closed and the delivery port 29 and branch 28 are both open. Consequently, air is drawn from the windbox 13 through the pipe 20 and branch 28 into the intake compartment 26 and the intake pipe 22 into the fan 24 and is then delivered through the delivery pipe 23, delivery chamber 25 and delivery port 29 to the atmosphere or to a stack or conduit for collection or further treatment.

When the valve stem or rod 33 is pulled upwardly it closes the branch 28 and the outlet port 29 and opens branch 27 and the intake port 30. In this position air is drawn through the intake port 30 into the compartment 26 and through the intake pipe 22 into the fan 24 and then is delivered through the delivery pipe 23, compartment 25, branch 27 and pipe 20 to the windbox 13.

In this case the direction of draft is reversed, being opposite from that indicated by the arrows, and the gas is forced by the fan 24 into the windbox 13 upwardly through the bed on the pallets 6 and into the hood 12. From the hood 12 it may be exhausted by the equalizing fan, or by other conduits, to the atmosphere or to a stack or collecting apparatus.

The valve stem 33 may be shifted, either by hand or by any suitable timing mechanism to give any desired heat control to the bed of material on the pallets 6. For example, if heat is conducted away from the combustion zone of the bed of material too rapidly, owing to a larger quantity of gases or for other reasons, the draft may be reversed and passed upwardly for a short period of time to carry heat from the layer below the combustion zone and from the combustion zone itself upwardly into the material of the bed of the combustion zone, which then absorbs the heat and retains it until the draft is reversed and passed downwardly; thereupon it gives up the heat thus stored to the downwardly passing air draft, preheating the latter before it enters the combustion zone, and thus retaining heat in the bed and obtaining the desired temperature.

On the other hand, if it is desired to reduce the temperature the up-draft may be continued for a longer period until the heat is carried out of the bed by the draft and the heat of combustion more widely dissipated or moderated by being distributed upwardly as well as downwardly from the combustion zone. By thus adjusting the up and down intervals, in accordance with the requirements in each particular case, a flexible and exact control of the heat may be obtained for any desired heat treating condition.

In those cases in which the periods of reversal are to be varied at different periods of the heat treatment, this may be accomplished by treating the material in batches rather than in a continuous sintering machine, or the windbox 13 may be divided into separate compartments each provided with individual blast control means.

In the apparatus illustrated, by way of example, in Fig. 2, the construction of the tracks and arrangement of the pellets are substantially the same as in Fig. 1, the corresponding elements being indicated by similar reference numerals.

In this case, however, air is to be alternatively withdrawn from the windbox 13, or from the hood 12, and it is, therefore, desirable or necessary to obtain a close seal between the hood and the pallets and the bed of material on them. Such a seal may be obtained at the inlet wall by the mass of unsintered material, indicated at 34, which will offer sufficient resistance to passage of air and form an adequate seal.

In order to seal the opposite end of the hood, however, a few of the pallets are omitted to form a gap immediately beyond the end wall of the hood and this end wall is made in the form of a hinged door 35 which fits tightly against the end pallet within the hood 12 and seals against suitable sealing devices, such as those well known in the art.

The pallets 6 are moved intermittently so that one or more of them pass at a time against the door 35 to lift it and then roll down the gap beyond this door to the lower track 17 and thus permit the door 35 to close again.

The hood 12 and the windbox 13 are connected respectively through conduits 36 and 37 to compartments 38 and 39 of a reversing valve 40. The compartments 38 and 39 are connected respectively by branch conduits 41 and 42 to an intake pipe 43 of a suction fan 44.

The compartment 38 is provided with an inlet port 45 immediately above the branch 41 and similarly the compartment 39 is provided with an inlet port or pipe 46 immediately below the branch 42.

A pair of sliding valves 47 and 48 in the compartments 38 and 39 respectively are so spaced and mounted on a push rod or stem 49 that in their lowermost position they cover the branch pipe 41 and inlet port 46, as indicated in Fig. 2.

In this position the intake pipe 43 of the exhaust fan 44 is connected through branch 42, compartment 39 and pipe or conduit 37 with the windbox 13 to withdraw air, or products of combustion, therefrom; while the inlet port 45 is connected through compartment 38 and the pipe 36 with the hood 12 to supply air thereto as it is drawn downwardly through the bed in pallets 6 into the windbox 13.

In this case the air is drawn under suction first into the hood 12, thence into the windbox 13 from which it is drawn by suction fan 44.

When the valve rod or stem 49 is drawn upwardly the valve 48 closes the branch 42 and the valve 47 closes the intake port 45 and opens the branch 41 thereby connecting the intake pipe 43 through the branch 41 and the compartment 38 with the pipe leading from the hood 12.

Similarly, the branch 42 being closed from the compartment 39, and intake 46 being open, air may be drawn through the intake 46, compartment 39 and pipe 37 into the windbox 13, in the opposite direction from that shown by the arrows, thence upwardly through the bed on the pallets 6 into the hood 12 and thence, in the opposite direction from that indicated by the arrows, through pipe 36, compartment 38 and branch 41 to the exhaust fan 44.

The up-draft takes place while the door 35 is closed to seal the hood 12. The down-draft may take place while the pallets are stationary or moving.

In this case the hood and windbox are always under a pressure less than that of the atmosphere. The fan 44 is always operated as an exhaust fan and its outlet may deliver directly to the atmosphere or to a stack or collecting system. In each case, however, the shifting of the valve rod or stem 49 serves to reverse the direction of the air or blast upwardly or downwardly through the bed on the pallets 6. The length of periods of the up and down blasts may be controlled to provide conditions suitable for any desired heat treatment, as described above in the system shown in Fig. 1.

It will be understood that the above diagrammatic embodiments are for illustrative purposes only and that any suitable sintering apparatus, either of the batch or stationary, or of the intermittent or continuous, type might be employed. The reversal of drafts may be controlled in such a manner as to distribute the heat upwardly or downwardly at any time, or for any length of period or periods, to obtain any desired temperatures or heat treating conditions at any part of the sintering bed. Thus the process and apparatus may be employed to moderate the temperature or prevent it from going too high, or to conserve heat and prevent it from falling too low, this being brought about by a suitable control of length of periods of up and down draft.

It might be desirable even so to arrange these periods of up and down draft as to conserve heat at one time to obtain a high temperature and to moderate it at another stage of the heat treatment. The method and apparatus provides a great flexibility in the means of heat or temperature control and produces any desired conditions for heat treatment or chemical reactions, such as sintering, calcining, oxidation, reduction or double decomposition, or changes in the physical characteristics of the material.

What I claim is:

1. A method of heat treating material containing metal compounds comprising igniting a bed of fuel and material to be treated at its upper surface, covering the ignited surface of said bed with an upper bed of said material and fuel and thereafter passing air for combustion alternatively downwardly and upwardly through said beds of material while said zone of combustion travels upwardly through said upper bed and downwardly through said underlying bed.

2. A method of oxidizing sulphide minerals which comprises igniting a bed of said minerals at the upper surface, drawing a draft of air for combustion downwardly through said bed to cause a zone of combustion to travel downwardly therethrough and periodically interrupting said downwardly traveling draft of air and passing a draft of gases upwardly through said bed while said zone of combustion travels downwardly therethrough.

3. A method of decomposing alkaline earth carbonates which comprises igniting a bed of a mixture of said carbonates and fuel at the upper surface of said bed, drawing a draft of air downwardly through said bed to cause a zone of combustion to travel downwardly therethrough and reversing said draft periodically to distribute heat from said zone of combustion upwardly through said bed while said zone of combustion travels downwardly therethrough.

4. The method of claim 3 in which said bed contains a small amount of a flux for alkaline earths.

5. The process of claim 3 in which said bed contains a small amount of iron oxide.

6. Apparatus for heat treating minerals which comprises a traveling grate, a windbox below said grate, a fan, and means to connect said windbox alternatively to the intake and delivery ends of said fan.

7. Apparatus for heat treating minerals which comprises a traveling grate, a windbox below said grate, a hood above said grate, a fan and means to connect the intake of said fan alternatively to said windbox and to said hood.

8. A heat treating apparatus which comprises a traveling grate, a windbox below and sealed to said grate, means to ignite a bed of material on said grate as it passes above said windbox, a fan having a suction end and a delivery end, means comprising a pair of simultaneously operated valves to connect said windbox alternatively with the suction and delivery ends of said fan.

9. Apparatus for heat treating minerals which comprises a traveling grate, a windbox below said grate and a hood above said windbox and grate and sealed thereto, means for igniting a bed of material on said grate entering said hood, a fan having an intake and delivery end, means for connecting said intake and delivery ends of said fan alternatively with said windbox and means for covering said bed of minerals with additional material as it enters said hood to form an upper bed.

10. Apparatus for heat treating minerals which comprises a traveling grate, a windbox below said grate, means for igniting a bed of material at its upper surface on said grate before it passes onto said windbox and means for covering said ignited surface with an additional layer of material to be treated to form an upper bed and means alternately to draw air from and supply it to said windbox.

11. A method of treating metal compounds containing combustile constituents which comprises igniting a bed of said material and combustible constituents at its upper surface, covering said ignited surface with an upper bed of said material and combustible constituents and passing oxidizing treating gases alternatively upwardly and downwardly through said beds of material while said zone of combustion travels upwardly through said upper bed and downwardly through said underlying bed.

12. A method of heat treating materials containing metal compounds which comprises forming a bed of said material, igniting and burning fuel and drawing the hot products of combustion thereof downwardly through said bed of material and periodically reversing said draft while a zone of combustion travels downwardly through said bed.

13. Apparatus for heat treating material containing metal compounds which comprises a grate, a wind box below said grate, means for igniting a bed of said material at its upper surface on said grate, means for covering said ignited surface with an upper bed of said material to be treated and means to pass oxidizing treating gases alternatively upwardly and downwardly through said bed of material.

14. A method of heat treating material comprising metal compounds which comprises igniting a layer of said material containing fuel at a surface of said layer, passing air for combustion of said fuel from said surface through said layer and periodically reversing the passage of air through said layer while a zone of combustion moves from said ignited surface in a single direction to the opposite surface.

15. A method of heat treating material containing metal compounds and combustible elements which comprises igniting said material at a surface of a layer of said material permeable to air, passing air from said ignited surface through said layer to cause a zone of combustion to pass from said ignited surface through said layer and periodically reversing the passage of air therethrough while said zone of combustion travels from said ignited surface to the opposite surface of said layer.

16. A method of heat treating material containing metal compounds which comprises igniting a layer of said material containing combustible elements at a surface of said layer, passing air for combustion through said layer from the ignited surface to the opposite surface at successive periods and carrying heat reversely through said layer between said periods by a reversed draft while a zone of combustion passes in a single direction from said ignited surface to the opposite surface of said layer.

17. The method of claim 14 in which the intensity of said blasts of air is varied at successive intervals of time.

18. A method of heat treating material containing metal compounds which comprises igniting a layer of fuel and material to be treated at an ignition place and at one surface of said layer, passing said layer progressively from said place of ignition and passing air for combustion of said fuel through said layer from said surface of ignition to the opposite surface after leaving said ignition place and periodically reversing the passage of air through said layer while a zone of combustion moves in a single direction through said layer from a surface of ignition to the opposite surface.

19. A method of oxidizing sulphide minerals which comprises igniting a bed of said minerals at one surface of said bed, drawing a draft of air for combustion through said bed from said ignited surface to the opposite surface to oxidize sulphur therein and to cause a zone of combustion to travel continuously in a single direction through said bed from said ignited surface to the opposite surface and periodically reversing the passage of air through said bed to distribute heat from said zone of combustion to material immediately adjacent said zone of combustion while said zone of combustion travels through said bed.

20. A method of decomposing alkaline earth carbonates which comprises igniting a bed of mixture of said carbonates and fuel at one surface of said bed, drawing a draft of air from said ignited surface through said bed to cause a zone of combustion to travel through said bed and reversing said draft periodically to distribute heat from said zone of combustion to zones immediately adjacent thereto while said zone of combustion travels continuously in a single direction through said bed.

21. A method of heat treating materials containing metal compounds which comprises forming a bed of said material and combustible constituents while igniting a zone of said material between the upper and lower surfaces thereof and passing oxidizing treating gases alternatively upwardly and downwardly through said bed of ignited material at successive short intervals to cause zones of combustion to travel from said ignited zone progressively upwardly through said bed to the upper surface thereof and progressively downwardly through said bed to the lower surface thereof.

THORNE E. LLOYD.